United States Patent [19]
Hooban

[11] Patent Number: 5,930,768
[45] Date of Patent: Jul. 27, 1999

[54] METHOD AND SYSTEM FOR REMOTE USER CONTROLLED MANUFACTURING

[75] Inventor: Edward Hooban, Arlington, Va.

[73] Assignee: Supersonic Boom, Inc., Fort Washington, Pa.

[21] Appl. No.: 08/597,252

[22] Filed: Feb. 6, 1996

[51] Int. Cl.⁶ ................................................. G11B 7/00
[52] U.S. Cl. ................ 705/27; 364/479.03; 364/479.04; 369/30; 369/84; 345/326
[58] Field of Search ............... 364/468.01, 468.24, 364/479.03, 479.04, 468.02, 468.06, 479.05, 479.06; 395/226, 210; 369/30, 84, 32, 33, 34, 36, 83; 235/375; 455/2, 4.2, 6.3; 705/26, 27, 28, 29; 348/7, 12, 13; 345/326, 327, 328

[56] References Cited

U.S. PATENT DOCUMENTS

| | | | |
|---|---|---|---|
| 4,528,643 | 7/1985 | Freeny, Jr. | 564/900 |
| 4,703,465 | 10/1987 | Parker | 369/30 |
| 4,797,818 | 1/1989 | Cotter | 364/401 |
| 5,291,396 | 3/1994 | Calcernao et al. | 364/401 |
| 5,295,066 | 3/1994 | Aoki | 364/401 |
| 5,307,261 | 4/1994 | Maki et al. | 364/401 |
| 5,311,424 | 5/1994 | Mukherjee | 364/401 |
| 5,319,542 | 6/1994 | King, Jr. et al. | 364/401 |
| 5,377,097 | 12/1994 | Fuyama et al. | 364/401 |
| 5,418,713 | 5/1995 | Allen | 364/403 |
| 5,440,479 | 8/1995 | Hutton | 364/401 |
| 5,550,735 | 8/1996 | Slade et al. | 364/401 R |
| 5,570,291 | 10/1996 | Dudle et al. | 364/468.01 |
| 5,592,511 | 1/1997 | Schoen et al. | 375/220 |
| 5,726,909 | 3/1998 | Krikorian | 364/514 A |

*Primary Examiner*—Eric W. Stamber
*Attorney, Agent, or Firm*—Rossi & Associates

[57] ABSTRACT

The invention enables persons with Internet (or other similar computer network) connectivity to remotely customize a product to be manufactured. In a preferred embodiment, a customer specifies a variety songs from a stated inventory of electronic audio media stored in a variety of remote databases and a desired playing order. After verification, the customer submits the order to a server. A series of programs located on the server (either physically or virtually) processes the order and sends the order to a production mechanism for the manufacture of the final product by downloading selected songs, writing the downloaded songs to a recording media and shipping the recorded media to the customer.

7 Claims, 10 Drawing Sheets

METHOD AND SYSTEM FOR REMOTE USER CONTROLLED MANUFACTURING

FIELD OF THE INVENTION

The present invention relates in general to a method and system for providing remote user control of a manufacturing process. More specifically, the invention relates to a method and system for enabling a remote user to select particular features of a product and to initiate production of the product through automated manufacturing processes.

BACKGROUND OF THE INVENTION

In order to remain competitive in a growing global marketplace, product manufacturers have been forced to search for solutions to lower product production and distribution expenses. Common problems associated with all product manufacturing processes are the intermediate organizational layers required to process customer orders into finished products and the need to optimize the distribution process to minimize expenses in shipping the finished products to the customer. With the advent of the information age, where the customer base is global and a growing number of products consist of machine readable media containing collections of data from a variety of worldwide source databases, the problems associated with processing customer order information into finished products and distributing the finished products on a global scale have been increased by several orders of magnitude.

The manufacture and distribution of music media is a classic example of the difficulties facing manufacturers of information based products. Music media is sold today in two primary forms: on "singles" consisting of a media containing one or two songs; or on "albums" consisting of a media containing a collection or compilation of several songs. In general, many consumers would prefer to buy albums containing a number of their favorite songs from a particular artist or from several artists, thereby reducing the number of tapes or compact discs they must purchase and physically handle. Music media manufacturers, however, are faced with a dilemma as to which songs will be considered "hits" by consumers. Thus, many album compilations consist of one true "hit" among a number of unknown and untested "filler" songs. Consumers must therefore contend with less-than-satisfactory products, while music media manufacturers are faced with the prospect of reduced sales because the "hit" on the album does not provide sufficient value for the consumer to make a purchase.

In order to attract additional sales, music media manufactures have offered "Greatest Hits" albums consisting of a compilation of the greatest hits of an individual artist or song compilations from a variety of artists. It is still difficult, however, for the music media manufacturer to determine which compilation of songs will result in the largest number of sales. The basis for the selection is often industry survey data indicating top hits over a certain time period. There is no guarantee, however, that a particular compilation of songs will find a sufficient market.

The problem of determining the best compilation of songs to gain the maximum return is further compounded by the present distribution process, which requires that a media manufacturer load the distribution pipeline with sufficient product to meet anticipated demand. Music media is currently distributed via retailers, discounters, wholesalers, and mail-order clubs, each of which must have sufficient stock in place in the event that the album is a commercial success. Thus, the music media manufacturer is faced with the possibility of significant financial losses due to unsold inventory and distribution expenses in the event that the album is not accepted by consumers.

It would be desirable to provide a system that would permit individual consumers to select their own compilation of songs based on their individual musical interests, thereby eliminating the problem music media manufacturers have in guessing which compilation of songs will result in maximum sales. Kiosk-based technology in which the customer could select a compilation of songs would seem to address the issue of customization of media, but distribution overhead is not significantly reduced by kiosk-based systems, as each kiosk must be restocked on a regular basis with media. In addition, kiosk-based technology is limited by physical and temporal barriers, namely, the customer must travel to the kiosk (physical barrier) at a time when the store containing the kiosk is open for business (temporal barrier).

In view of the above, it is an object of the present invention to provide a method and system for providing remote user control of a manufacturing process, and particularly a manufacturing process requiring the compilation of electronic data from one or more source databases, while providing a system that is free from physical and temporal barriers.

SUMMARY OF THE INVENTION

The present invention is directed to user defined assembly and manufacture of a product, particularly electronic media, wherein each component of the manufacturing process and system can be remotely located to decentralize the manufacturing process. The invention relies on a communications infrastructure, for example the Internet (based upon the Transmission Control Protocol/Internet Protocol, TCP/IP), wherein each component of the system is able to pass relevant data to a subsequent component until a complete user defined product is created.

By breaking down temporal and physical barriers to customize configurations, the method and system revolutionizes the manufacturing, packaging, and distribution aspects of electronic media based products. Inventory issues, for example, are eliminated by allowing "Just In Time" manufacture of customized media. Distribution is simplified and expenses minimized by routing orders to the manufacturing facility geographically closest or economically closest (based on shipping costs) to a particular customer.

In a preferred embodiment, the system utilizes an Internet (that is TCP/IP compliant) graphical user interface (GUI) for interacting with individual customers or users. The system also includes an Internet (TCP/IP) server that interacts with the user via the user's client interface. The user interface allows the user to interactively query a repository (or repositories) of song titles and artists and select, delete, and reorder a desired compilation of songs. These functions are provided for by either server side programs (via the Common Gateway Interface) which accept relevant data (e.g. a search term) or a client side applet (e.g. Java) which is a program downloaded to a client and which executes in the client environment.

For example, the user assembles the songs that are to be put on their customized compact disc (CD) media within the client graphical user environment. The applets or CGI programs do simple verifications and calculations such as making sure that the user does not select more songs than can fit on a standard CD, allow the user to dynamically arrange the order of selected songs, and calculate the price of the songs including media price, royalties, taxes, etc. The applets/CGI programs also take care of updating the client side screens with the relevant information by making sure that the appropriate TCP/IP messages are sent. After making all desired selections, the user is asked to enter a credit card number or some other type of billing information preferably encrypted for security purposes. Once the user has verified that he/she wants a particular compilation of songs in a desired particular order, the information is passed to a server for fulfillment in which a customized product is produced.

The server merely acts as an intermediary and is capable of quickly handling numerous simultaneous requests. The server passes the appropriately packaged information on an order to a program which places the order in a queuing database and updates the song repository database where all billing and royalty information is contained. A dispatching program periodically scans through the queuing database and dispatches pending orders to production device drivers that are configured to accept orders and drive compact disc writing (CD-R) machines to create customized CD's.

There are preferably a plurality of physical production device drivers geographically dispersed so that a particular order can be handled by the device driver geographically closest or economically closest (in terms of shipping expenses) to the user or the shipping location defined by the user. Once it has been dispatched with an order, the production device driver parses out the user defined production parameters, retrieves the desired song data by looking up locations in the song repository database and transferring the data to local hard drives, assembles the tracks into the appropriate order, creates an industry standard Red Book image for audio on CD-ROM, and controls a CD-R machine to burn it to a CD. It then sends a message back to the dispatching program indicating that the order has been completed.

The CD is removed from the CD-R machine, packaged with user selected artwork and liner notes, and shipped to the user, preferably utilizing automated packaging and shipping systems. If desired, the production device driver program provides a display indicating that the order is completed on a local display monitor and generates a hard copy of the order. This allows a staff person to accurately associate a completed order with the shipping information and order details.

The invention eliminates the requirement for the music media manufacturer to conduct surveys or other market research to determine what compilation of songs may result in the greatest amount of sales. Instead, the manufacturer benefits by understanding what songs are most popular by getting direct feedback from the user as individual orders are filled, as marketing information is directly tied to purchase information. Channels of communication are much more direct and efficient, thereby reducing distribution expenses. The consumer benefits by being able to select only those songs which are of interest.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Figure 1:
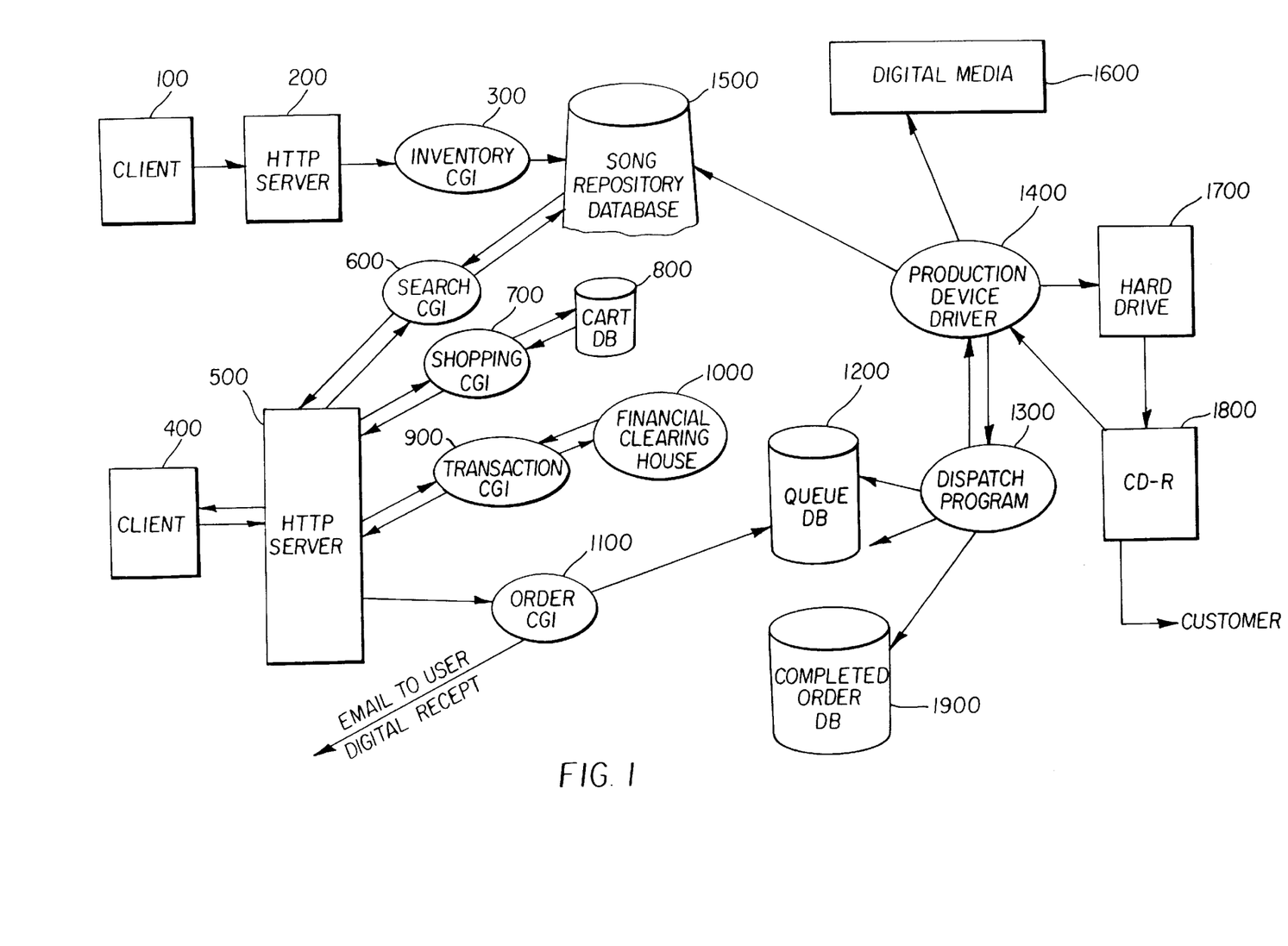
FIG. 1 is an overall block diagram of a system in accordance with the invention.

The components of the manufacturing production system in accordance with the invention are illustrated in FIG. 1. All of the illustrated components fall into two categories: client-side interactive components and production-side process components. The client 400 consists of communications hardware and an operating system with a graphical user interface (GUI) to the Internet. Ideally, the client 400 has a robust graphical browser installed allowing for Hypertext Markup Language (HTML) forms input to a Hypertext Transport Protocol (HTTP) based server 500 for the World Wide Web (WWW) and the capability to run applets on a Java virtual machine. The server 500 consists of hardware, software (HTTP protocol compliant and Common Gateway Interface (CGI) compliant), and an operating system.

A series of Java applets or CGI programs provide for user interactivity. For example, a SEARCH.CGI program 600 searches and retrieves information from one or more Song Repository databases 1500, a SHOPPING.CGI program 700 adds and deletes items from an assembly specification sheet, thereby allowing a user to rearrange the order of these items, a TRANSACT.CGI program 900 allow users to conduct online financial transactions, and a ORDER.CGI program 1100 completes the transaction and queues the order on a database of pending orders in a Queue database 1200.

On the production side, several hardware items and software programs facilitate creation of a user-defined order for a custom CD. A DISPATCH program 1300 polls the order requests in the Queue database 1200 at set time intervals and sends customer-defined manufacturing requests to a production device driver 1400. An unlimited number of remote production device drivers 1400 can communicate with a single DISPATCH program 1300, which facilitate load balancing of queued orders and geographically optimized manufacturing.

The production device driver 1400 receives customer orders via TCP/IP from the DISPATCH program 1300. After parsing the order, the production device driver 1400 retrieves song data from one or more of the Song Repository databases 1500, which can also be geographically distributed. After retrieving all appropriate data, the production device driver 1400 creates an industry standard Red Book image for audio. In the illustrated embodiment, the production device driver 1400 resides on a separate machine from the server 500 and DISPATCH program 1300 and is coupled to a multiple Gigabyte hard disk 1700 which stores the Red Book image. A compact disc writing (CD-R) device 1800 is coupled to receive the Red Book image from the hard disk 1700 or directly from the production device driver 1400, which burns the Red Book image to a CD-R media. After burning, the CD-R media is packaged, postmarked, and shipped to the user, preferably by an automated packaging and shipping system that is physically located at express shipping facilities throughout the world.

Each of the components of the system can be remotely interfaced via the TCP/IP protocol in a client-server communication model. The medium and set of protocols ideally suited for implementation of the system is the World Wide Web (WWW), which is based on the TCP/IP protocol and client-server model. The WWW consists of two standards—Hypertext Transport Protocol (HTTP) and Hypertext Markup Language (HTML). HTTP facilitates the universal transfer of data objects (hypertext enabled components) around the WWW. HTML provides for the display of text and graphic information by client-side WWW browsers. Java applets are ideal components in the distributed process. Java is a platform-independent programming language designed for Internet usage. Executable applets are downloaded from a server machine to the client machine, thereby reducing load on the server.

The WWW infrastructure provides for a universal and standard communication medium. This allows potential customers to communicate with the system regardless of their type of computer and operating system. The only requirement for a client machine (and the ideal embodiment) is a TCP/IP stack (fundamental to communication over the Internet) and a browser that is forms- and Java-compliant (i.e., supports the Java virtual machine).

Figure 2:
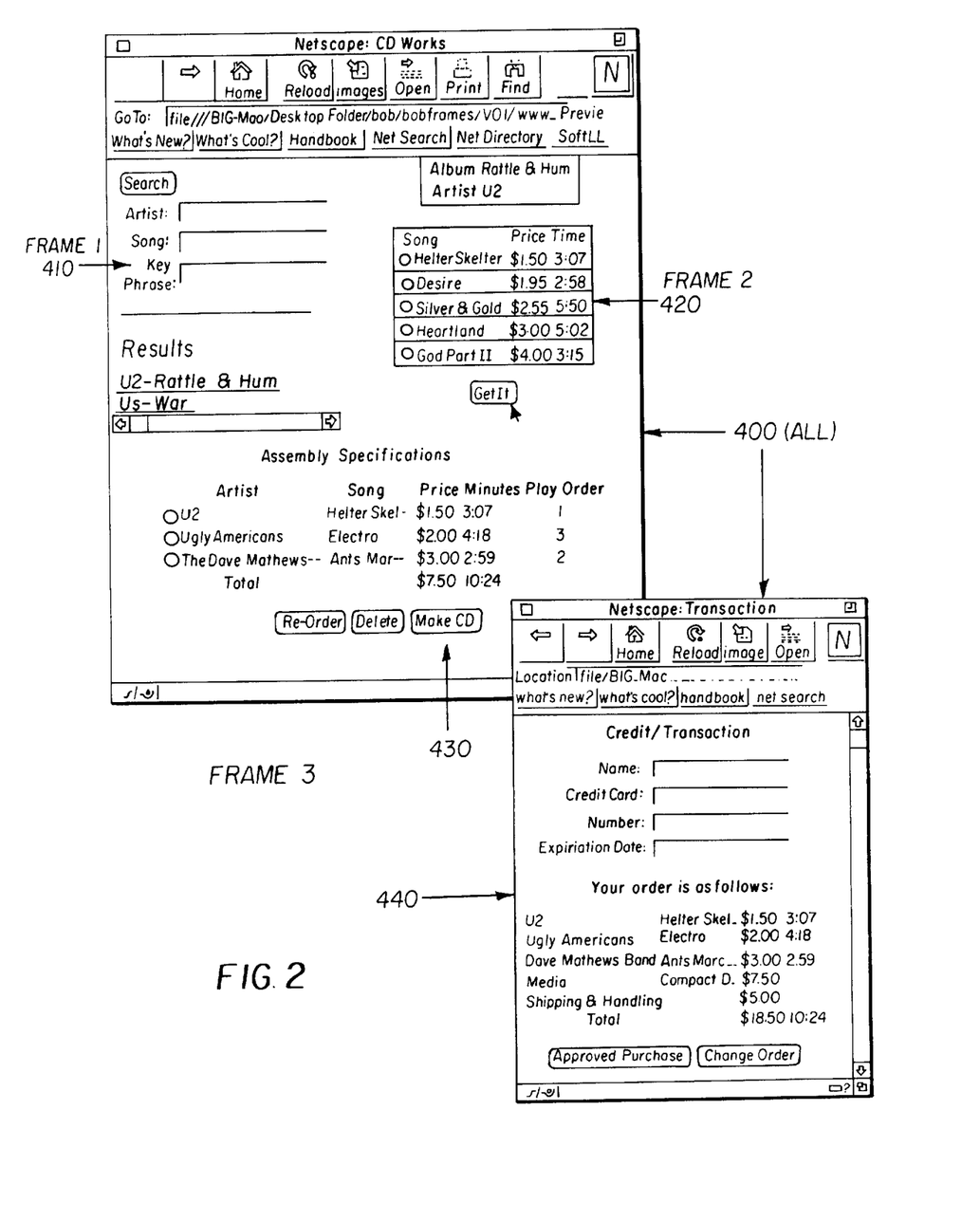
FIG. 2 an illustration of a graphical front end screen used in the system illustrated in FIG. 1.

The manufacturing method in accordance with the invention will now be described in greater detail. The client 400 makes a request to the server 500 for a three-frame HTML formatted entry page to the system that will provide the user with basic client-side functionality. The server 500 then responds with an introductory HTML page with three frames as illustrated in FIG. 2: Frame (1) 410 allows a user to search the song repository database 1500; Frame (2) 420 allows a user to see details about search hits via hypertexts link from Frame (1) 410 and add songs to his/her list; and; Frame (3) 430 tracks the user's selections and allows the user to delete, re-order, or purchase the songs. Presently, the client 400 that ideally embodies the needs of the system is the NetScape Navigator. Navigator is available on a number of platforms, providing the same functionality regardless of the underlying operating system. It is a WWW browser that has the ability to display frames (separate areas of remote activity displayed concurrently in the client-side browser), tables, and a rich set of HTML tags as well as to execute Java applets inline. There is no requirement for client hardware/operating system except that it have support for TCP/IP communication and can run a Navigator browser. The client 400 is the entry point into the system. The client 400 needs to actively open the communications link with the server 500 that facilitates custom CD creation.

The WWW server 500 communicates with clients via TCP/IP and HTTP. It will respond to client 400 requests for data objects and applets. The server 500 should be robust enough to handle multiple simultaneous requests in a secure manner. The server 500 will need to have a high bandwidth data line over which to communicate with numerous clients. Ideally, the server 500 communicates on T-3 data lines (or cable-TV lines). Given those parameters, the server that presently best suits the needs of this process is the NetSite Commerce Server. The server 500 software should be running on a high-performance hardware system. The presently preferred embodiment would be a Sun Ultra SparcStation running the Solaris operating system (which has TCP/IP built in). The server 500 has a sufficient amount of Random Access Memory (64 MB) and hard disk space (1 Gigabyte) to handle a large volume of requests, and runs on top of the operating system as a daemon (a continuously running process), thereby allowing us to accept orders 24 hours a day via remote TCP/IP communication.

An exemplary implementation of the client 400-server 500 interaction (the first step in the process) is the request by the client 400 for remote entry into the manufacturing system. The server 500 receives the request and sends back the appropriate object/applet. The client 400 then renders the object. The user reads instructions and information through the client-side GUI and interacts with applets/CGI programs through the client-side interface.

Figure 3:
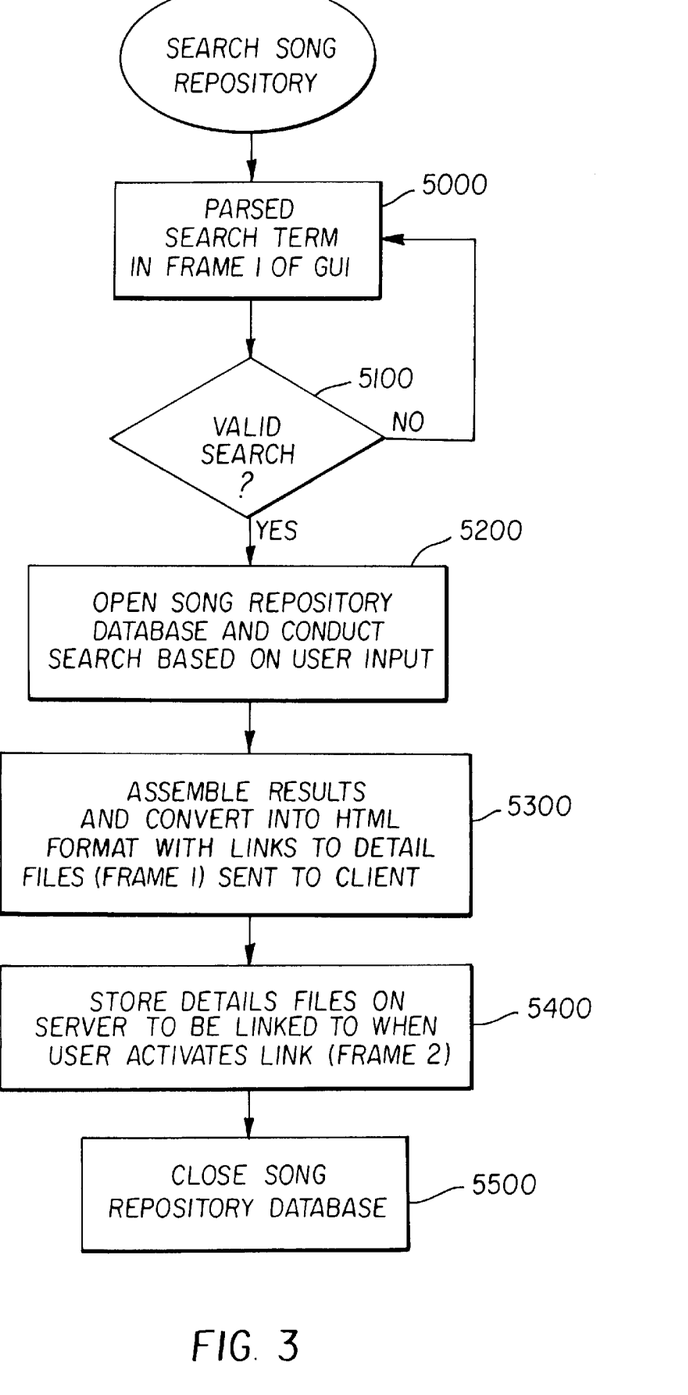
FIG. 3 is a flow chart of a media repository search routine used by the system illustrated in FIG. 1.

The user can make several interactive choices including searching through the repository of songs using the SEARCH.CGI program 600. The user enters a search term in Frame (1) 410 of the GUI that the SEARCH.CGI program 600 will parse as shown in Step 5000 of FIG. 3. The SEARCH.CGI program 600 then verifies that the search is valid (Step 5100), and, if so, opens the Song Repository database 1500 (Step 5200). Search results are assembled into HTML format with a summary result page (Frame (1) 410) and a detail result page (Frame (2) 420). Hypertext links originate in the Frame (1) 410 summary window and point to detail results in the Frame (2) 420 details window.

Figure 4:
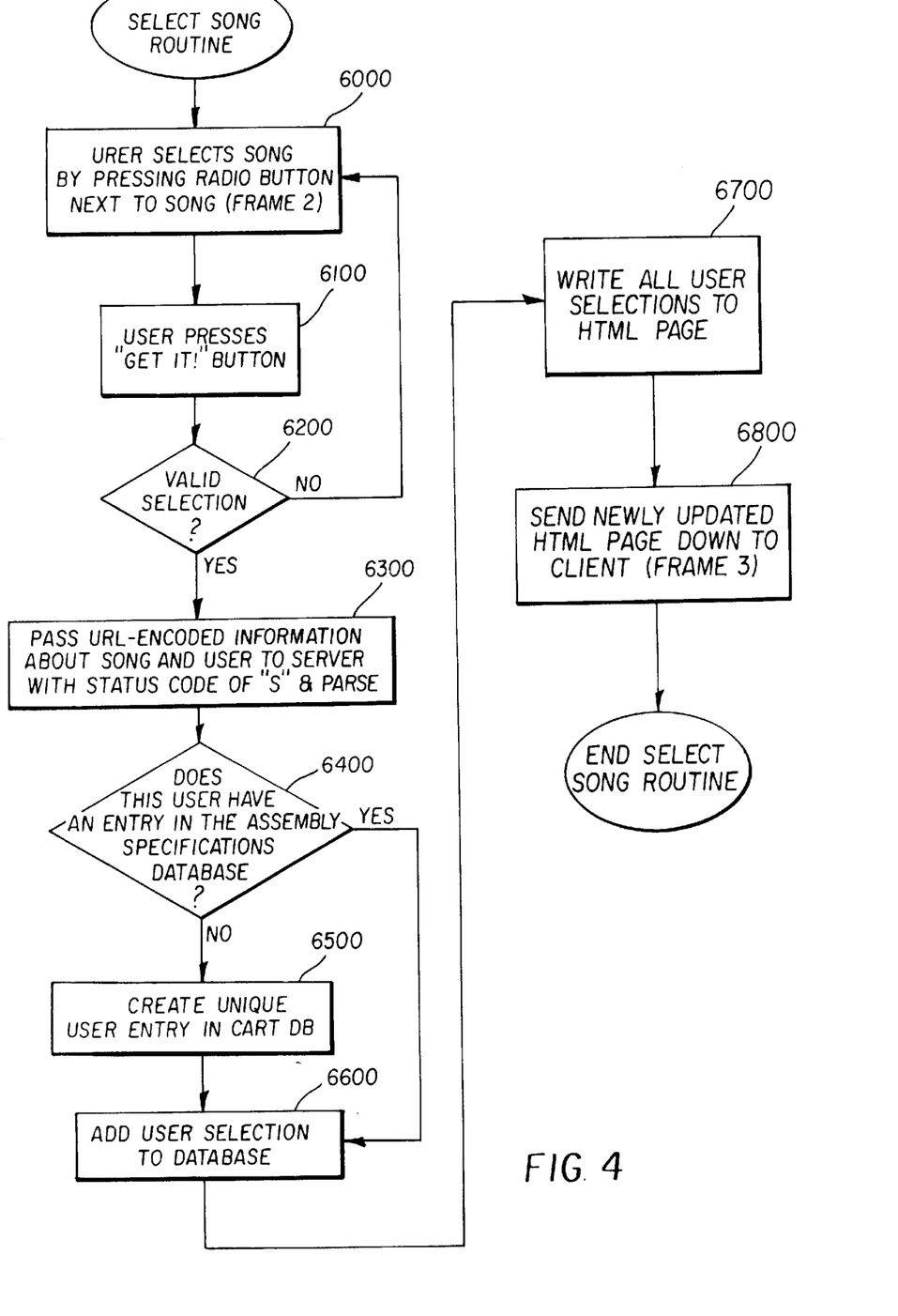
FIG. 4 is a flow chart of a select song routine used by the system illustrated in FIG. 1.

A second interactive feature on the client side is to allow the reader to scroll through a detailed list of songs in Frame (2) 420 and make a selection as to whether he/she wants to add the item using the SHOPPING.CGI program 700 illustrated in FIG. 4. The user makes a selection by pressing radio buttons next to desired items (Step 6000) and submits the selection by clicking the "get it" button (Step 6100). The program needs to verify that the selection is valid (Step 6200). If the selection is valid, the program will parse out the hidden field, STATUS CODE, with value "s" (Step 6300). Next, it will check the Cart database 800 (Step 6400) to start a transaction state. If the user is currently making selections (based on a unique session key generated upon entry into the system), the program adds a current component to virtual spec sheet (Step 6600). All user selections are then formatted into an HTML page utilizing table tags/subtags and sent down to Frame (3) 430 to be rendered (Steps 6700 and 6800).

Figure 5:
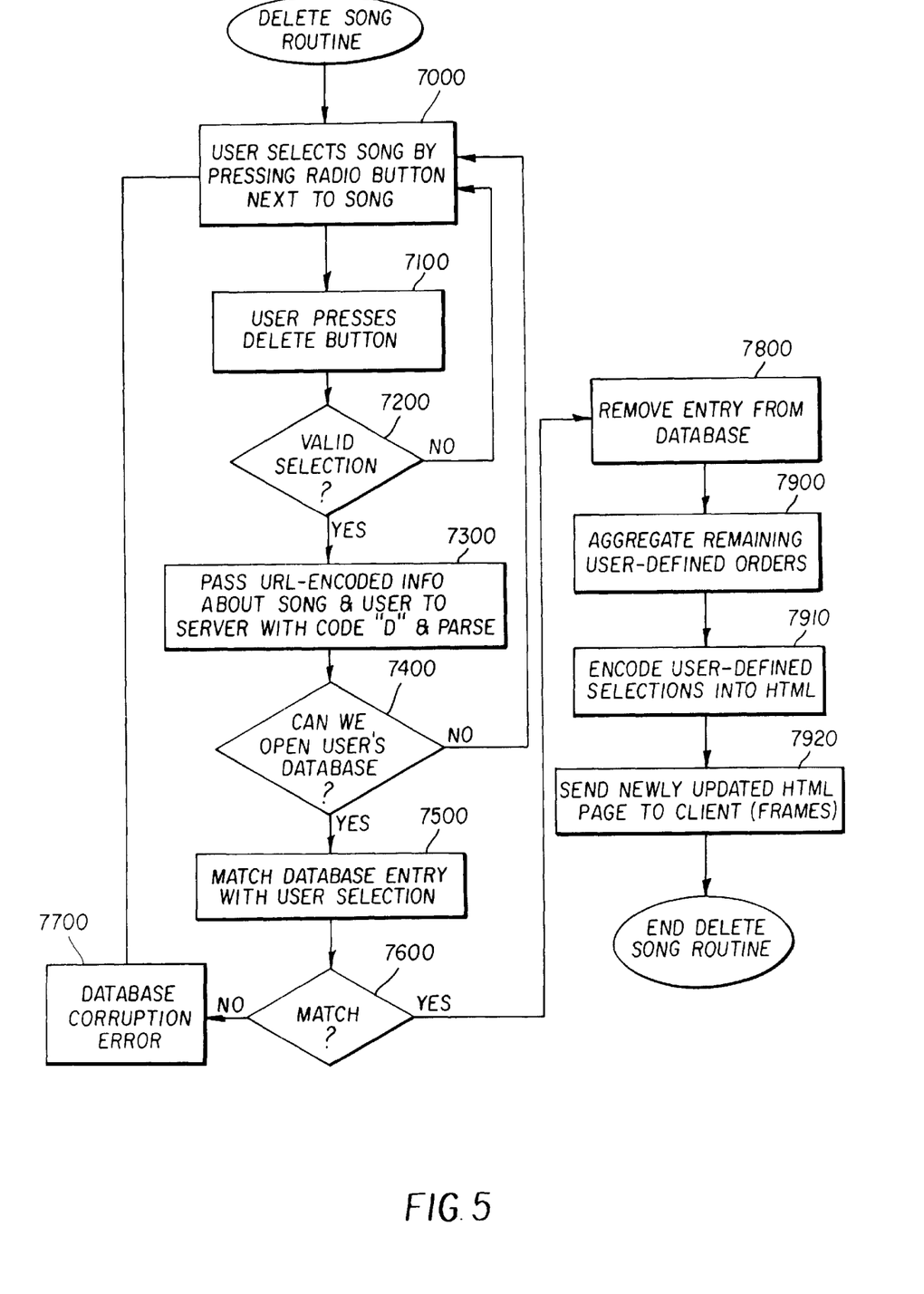
FIG. 5 is a flow chart of a delete song routine used by the system illustrated in FIG. 1.

The user has several interactive options in Frame (3). The user has the option of rearranging the order of components, deleting a component, or confirming the specified order. If the user would like to delete an item, the user would press a radio button next to the item as shown in Step 7000 of the delete song routine illustrated in FIG. 5, and then press the "Delete" button (Step 7100). The SHOPPING.CGI program 700 would make sure that this was a valid selection (Step 7200). If so, the STATUS CODE hidden field with a value of "D" would be parsed out (Step 7300). The Cart database 800 is then opened and the matching user entry is found based on unique session ID (Step 7500), the selected item is removed from the database list (Step 7800), and remaining user-defined orders aggregated (Step 7900). The user-defined orders are encoded into an HTML page utilizing table tags/subtags and sent down to Frame (9) 430 or a client window (Steps 7910 and 7920).

Figure 6:
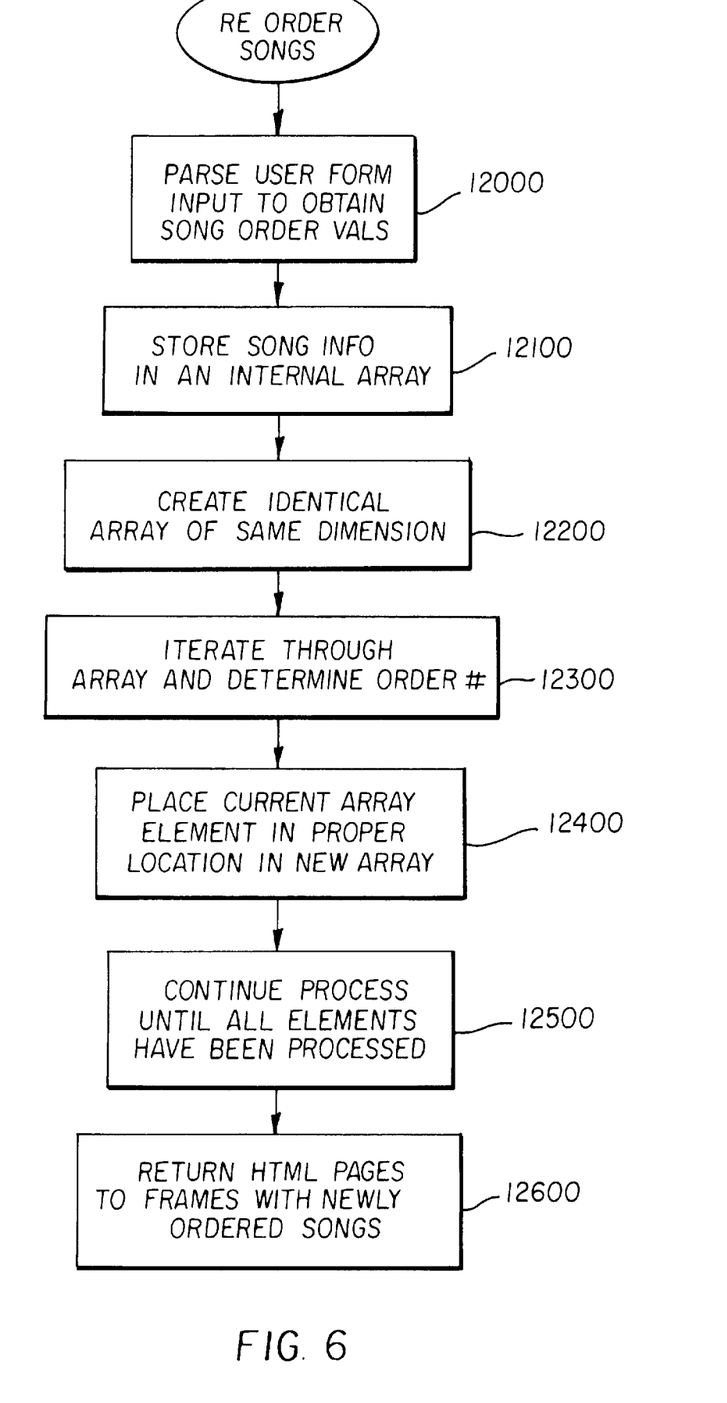
FIG. 6 is a flow chart of a re-order song routine used by the system illustrated in FIG. 1.

The second interactive option in Frame (3) 430 is the capability to re-order assembly components. A user fills out a text field beside each component with a numerical value between 1 and the total number of components. The user then presses the "ReOrder" button. The numbers associated with each component will be parsed out along with the component. The items will be sorted and packaged back up into an HTML page utilizing tags/subtags. The reorder routine is shown in detail in FIG. 6.

Figure 7:
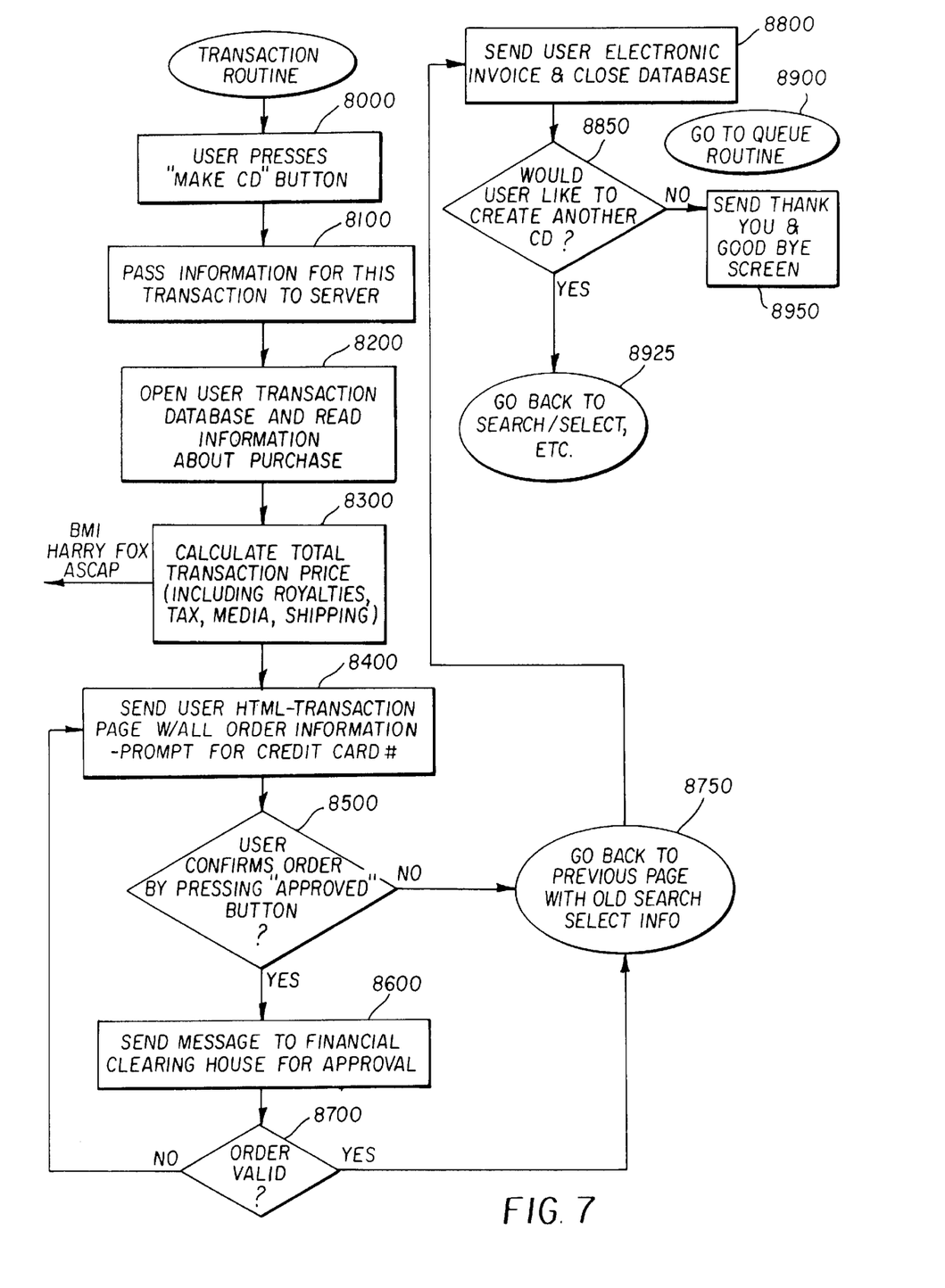
FIG. 7 is a flow chart of a transaction routine used by the system illustrated in FIG. 1.

The final interactive component in Frame (3) 430 is the capability to make the order and conduct a financial transaction as illustrated by the transaction routine shown in FIG. 7. The user presses the "Make-CD" button (Step 8000). The information about this particular user and their particular order is URL-encoded and passed to the server (Step 8100). The Cart database 800 is opened and all information about this particular order is read into internal data structures (Step 8200). All the appropriate calculations are made, including royalties on copyrighted material, media, taxes and shipping (Step 8300). An HTML formatted page is sent down to the client with all of the order information to prompt the user for credit card information (Step 8400).

Figure 8:
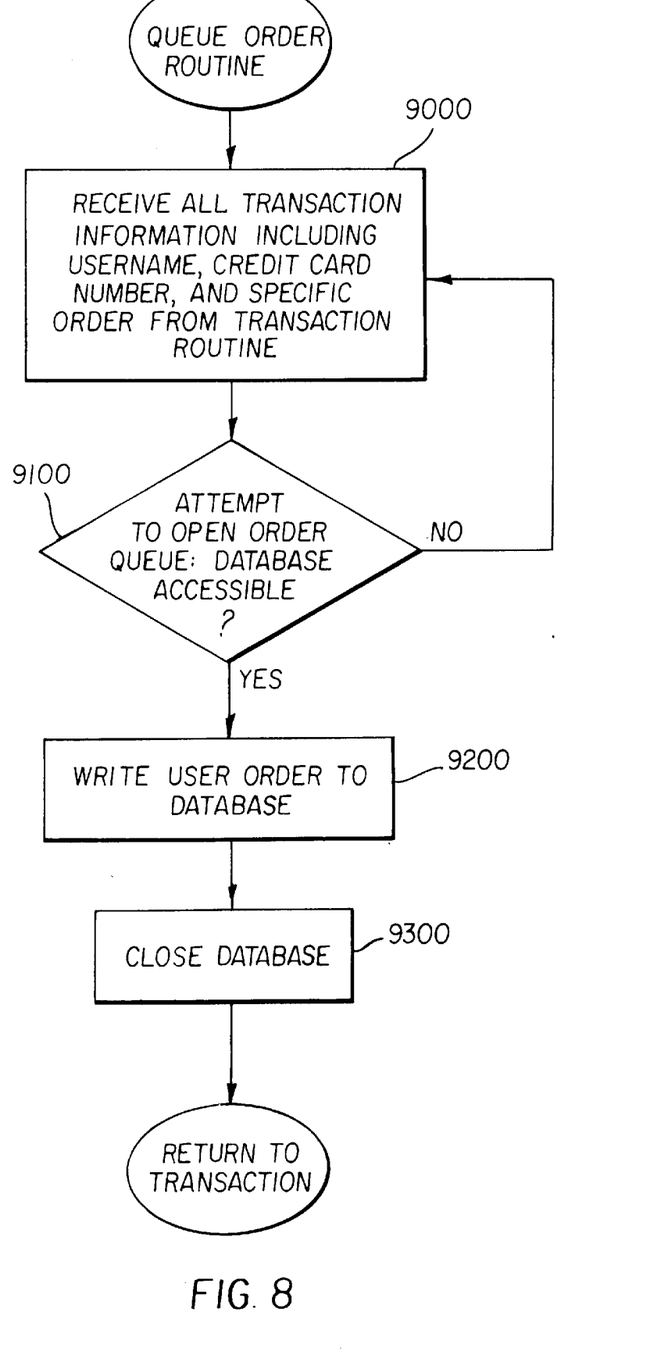
FIG. 8 is a flow chart of a queue order routine used by the system illustrated in FIG. 1.

At this point, the user is allowed to review the order and decide whether he/she actually wants to confirm and commit the financial transaction. The server 500 processes the "Approve Purchase" button acknowledging that the user is verifying the order. The ORDER.CGI program 1100 processes the user's credit card information, expiration date, and other information relevant to electronic financial transaction (step 8500). The ORDER.CGI program 1100 is responsible for electronically connecting with the appropriate third-party clearinghouses and moving the funds (Step 8600). The clearinghouse verifies that a user's credit card is valid and that the merchant exists. If the order is valid (Step 8700), the user is preferably sent an electronic invoice/receipt via e-mail (Step 8800). Next, the user is prompted though his/her client-side GUI to make another custom item (Step 8850). The order is then queued to the Queue database 1200. All information is packaged up from the client into a Queue database 1200 data structure as illustrated in the Queue Order Routine shown in FIG. 8 (Step 9000). The ORDER.CGI program attempts to open the Queue database 1200 (Step 9100) and, upon success, will write the new order to that database (Step 9200). The database is then closed (Step 9300).

The Queue database 1200 acts as an intermediary between front-end client interaction to create a custom product and a back-end production process. The dispatch program 1300 will be running as a daemon process on either the same machine as the server or another machine with a TCP/IP communication connection to the machine with the Queue database 1200. The dispatch program 1300 periodically polls the Queue database 1200. The dispatch program 1300 will have several functions. It will dispatch new jobs, update status of in-process jobs, and move items to the Completed Order database 1900 when jobs have finished.

Figure 9:
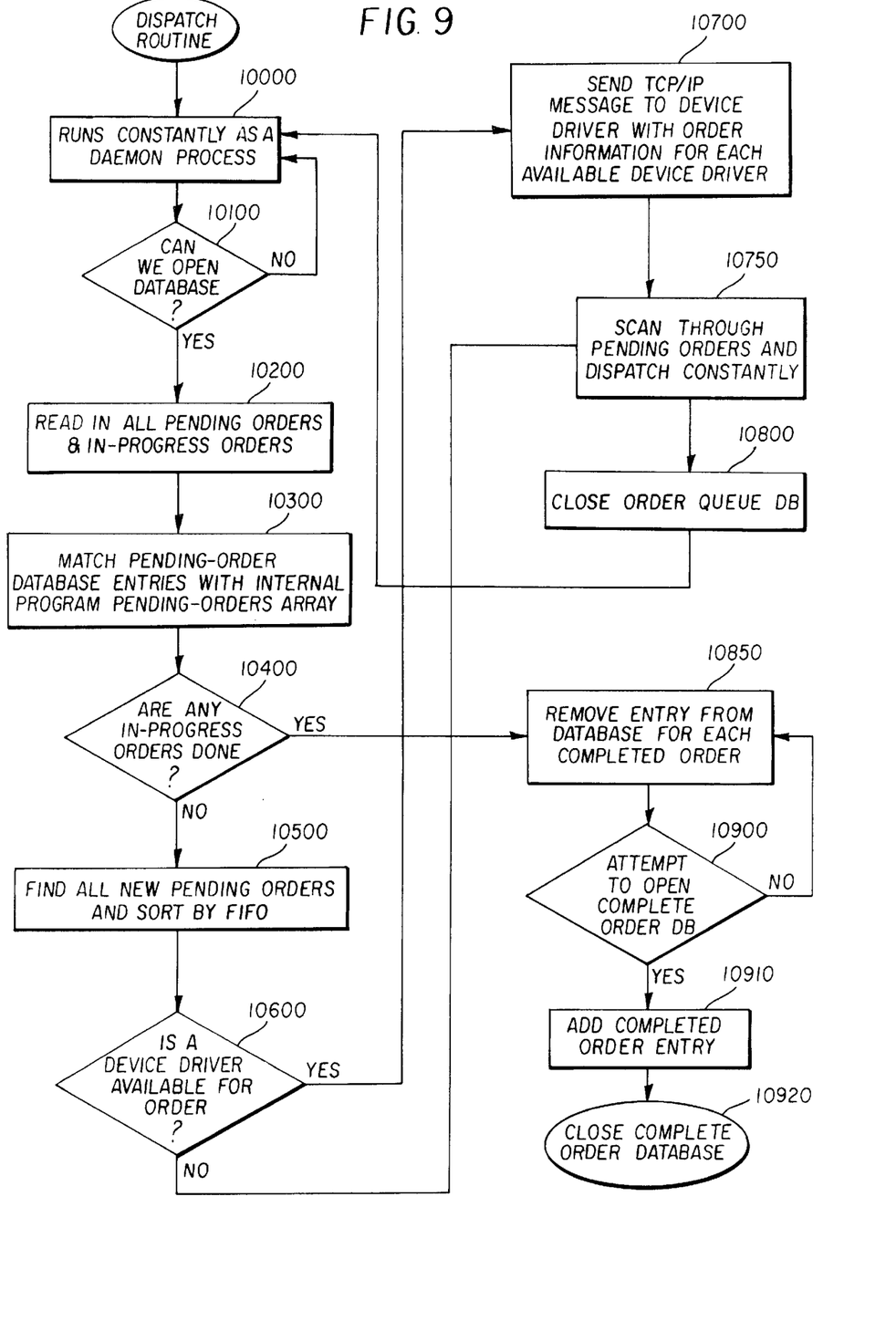
FIG. 9 is a flow chart of a dispatch routine used by the system illustrated in FIG. 1.

During a session with the Queue database 1200, the dispatch program 1300 (utilizing the routine shown in FIG. 9) runs continuously as a daemon (Step 10000). At periodic intervals, which can be adjusted, it attempts to open the Queue database 1200 (Step 10100) and read all pending orders into an internal array. It will also collect all in-progress orders into another array (step 10200); a constant array data structure that has a true/false value for each production device driver 1400 and an IP address where each production device driver 1400 is located. For each pending order, sorted by FIFO (Step 10500), the dispatch program 1300 scans through the array of available device drivers 1400 (step 10600). If one is available, it then dispatches a message with the contents of the order to that device driver 1400 via TCP/IP (Step 10700). It then changes the status of the pending order to "in-progress" and writes this record back out to the Queue database 1200. This process will continue until each pending order has been dispatched or all device drivers 1400 are running jobs (Step 10750). At this point, the program closes the Queue database 1200. When all device drivers 1400 are in use, orders will be re-written to the Queue database 1200 as pending. If an order was previously in progress and is now complete, the dispatch program 1300 writes the completed order information to the Completed Order database 1900 (Steps 10400, 10850, 10900, 10910, 10920).

In the preferred embodiment, each of the production device drivers 1400 will be running as a daemon that is associated with a specific Compact-Disc Writable (CD-R) 1800 machine and a specific hard drive 1700 with at least 2.0 Gigabytes of usable disk space on a desktop class PC with a SCSI bus. The production device driver 1400 has several functions which are illustrated in the production routine shown in FIG. 10. First, it is responsible for responding to polling requests from the Queuing program. Second, it is responsible for processing orders that it does accept. Third, it is responsible for letting the queuing program know that it is done with an order. These functions are handled with a simple client-server architecture, whereby the production device driver 1400 acts as both client and server communicating via TCP/IP to the dispatch program 1300.

Figure 10:
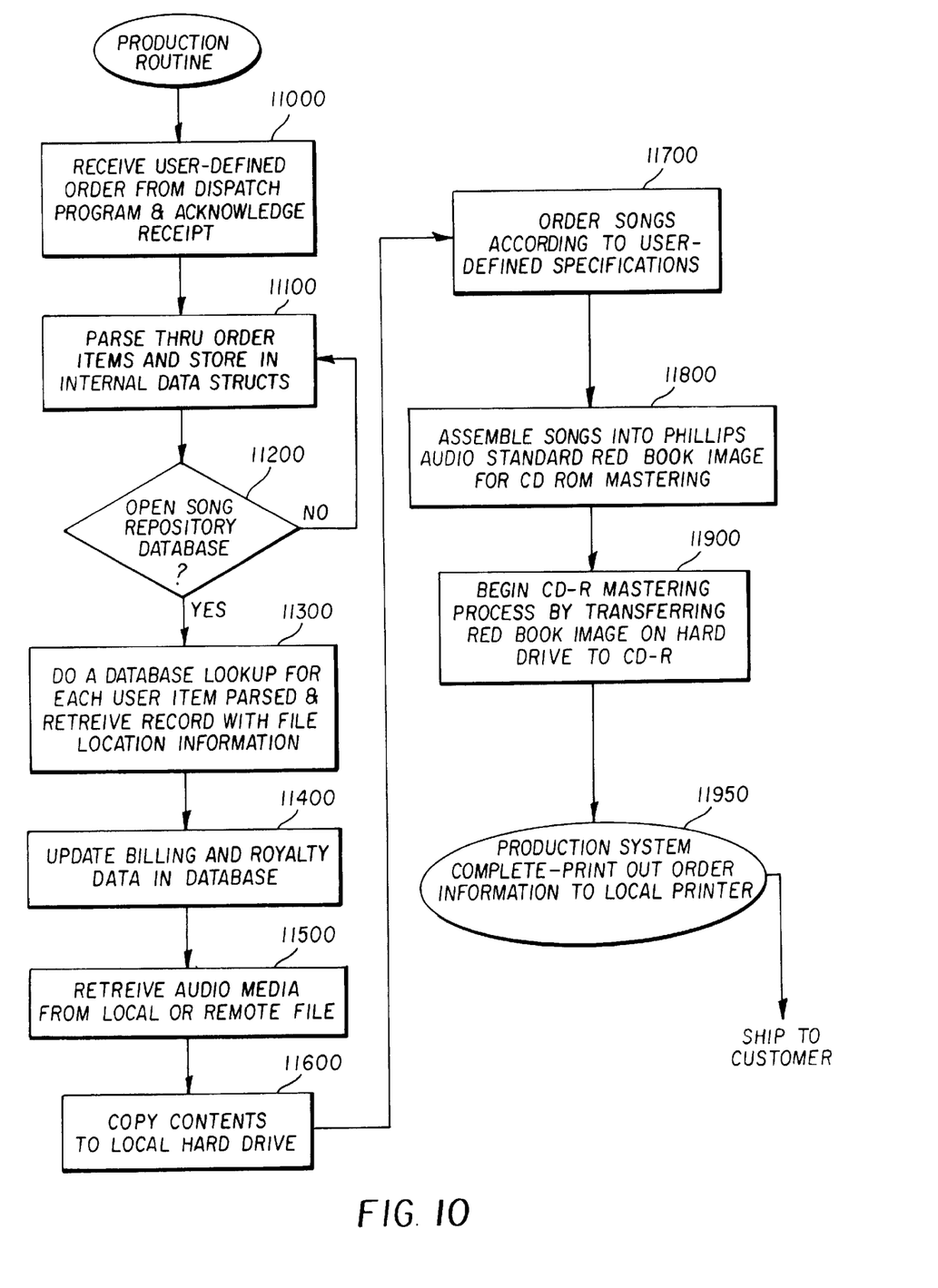
FIG. 10 is a flow chart of a production routine used by the system illustrated in FIG. 1.

The song repository database 1500 is the central data component in the entire system. It is the same database that the user makes inquiries against to check for songs and pricing data. The production device driver 1400 reads through the user's order and queries the song repository database 1500 for logistical information such as where the song data is physically located (Step 11300). In the preferred embodiment, the database is robust enough to handle hundreds of thousands of tables representing all possible song entries. Its functions would include billing, royalty tracking, and reporting as well as pointers to digital media stores. It is envisioned that the preferred embodiment would utilize ORACLE as the database. ORACLE has numerous features that allow remote access/querying of its contents as well as robust scaling capabilities. Reports would be generated from this database for marketing and demographics studies that would then be re-sold to the recording industry. The song repository database 1500 can be updated through the use of a client 100 communicating with a server 200 that runs an INVENTORY.CGI program 300.

One of a plurality of production device drivers 1400 will make the appropriate queries for each of the user requested songs. It assembles pointers indicating where those digital audio files actually reside and update the billing and royalty information for each item retrieved (step 11400). The next step is the retrieval of the data. In a preferred embodiment of the invention, data retrieval occurs over high-speed data lines (such as T-3 or cable) via the File Transfer Protocol (FTP). If the files exist on a local Network File System, it is simply a matter of retrieving these across the network to the local hard drive 1700 where the mastering process is occurring (Step 11500). After retrieving the individual digital song files to the local hard drive 1700, the production device driver 1400 then creates the industry standard Red Book image for CD mastering of audio data from the assembled files (steps 11700 and 11800). This information is then transferred to the CD-R 1800 for physically burning the image to the CD-R media via the CD-R machine 1800 (for example a Hewlett Packard 40201) (Step 11900). The information can also be sent to other types of digital media 1600.

After writing the Red Book audio image to the CD-R media, the disc is ready to be packaged and shipped to the customer. An administrator can check off an electronic check list on a standard output, such as print or monitor, of orders queued up for the particular device, remove the old media and replace it with new media. Alternatively, the process can be automated to further reduce manufacturing expenses.

The invention has been described with reference to certain preferred embodiments thereof. It will be understood, however, that modifications and variations are possible within the scope of the appended claims. For example, the invention is applicable to the manufacture of all types of products, and is not limited to the manufacture of digital electronic media products or music CD's in particular.

What is claimed is:

1. A system for remote user controlled manufacturing, said system comprising:

user interface means for entering user defined order data corresponding to a product to be manufactured, wherein the user defined order data includes initial sequence data that defines an initial production sequence, wherein the user interface means includes reorder means for selectively reordering the initial sequence data, in response to user defined reorder text data, to generate reordered sequence data corresponding to a desired production sequence, and wherein the reorder means includes means for entering the reorder text data, means for storing the initial sequence data in a first array, and means for generating a second array including the reordered sequence data in response to the reorder text data;

server means for producing verified customer order data in response to the user defined order data entered via the user interface means; and production means for automatically producing the product to be manufactured in response to the verified customer order data produced by the server means;

wherein the server means stores the verified customer order data in an order queue database;

wherein the production means includes at least one production device driver and dispatching means for dispatching the verified customer order data stored in the order queue database to the production device driver;

wherein the production device driver retrieves electronic data from at least one repository database in response to the customer order data; and wherein the electronic data retrieved from the repository database includes a plurality of individual data files and the production device driver arranges the individual data files in the desired production sequence based on the reorder sequence data stored in the second array.

2. A system for remote user controlled manufacturing as claimed in claim 1, wherein the production means includes a plurality of production device drivers and the dispatching means dispatches the verified customer order data to one of the plurality of production device drivers based on a predetermined characteristic of the customer order data.

3. A system for remote user controlled manufacturing as claimed in claim 1, wherein the product to be manufactured comprises a recording media and the production means includes a media writing device that is controlled by the production device driver to write the sequenced individual data files on the recording media.

4. A system for remote user controlled manufacturing as claimed in claim 1, wherein the server means includes search means for searching the repository database for selected data files in response to the user defined order data.

5. A system for remote user controlled manufacturing as claimed in claim 4, wherein the server means includes transaction means for verifying financial transaction data included in the user defined order data.

6. A system for remote user controlled manufacturing as claimed in claim 5, wherein the server means further includes order generation means for generating the customer order data and storing the customer order data in the order queue database.

7. A system for remote user controlled manufacturing as claimed in claim 6, wherein the order generation means includes means for transmitting electronic receipt information to a user to verify the storing of the customer order data in the order queue database.

* * * * *